United States Patent [19]

Bearcroft et al.

[11] Patent Number: 4,472,022
[45] Date of Patent: Sep. 18, 1984

[54] VORTEX FLOWMETER

[75] Inventors: Kenneth E. Bearcroft, Lichfield; Richard H. Barnard, St. Albans; Terence P. Stock, Bishops Stortford, all of England

[73] Assignee: ITT Industries, Inc., New York, N.Y.

[21] Appl. No.: 377,421

[22] Filed: May 12, 1982

[30] Foreign Application Priority Data

May 14, 1981 [GB] United Kingdom ................ 8114743

[51] Int. Cl.³ .......................... G02B 5/14; G01F 1/32
[52] U.S. Cl. .................... 350/96.29; 73/655; 73/702; 73/705; 73/861.24; 350/96.15
[58] Field of Search .......... 73/861.21, 861.22, 861.24, 73/653, 655, 651, 705, 717, 517 R, 702; 250/227; 350/96.15, 96.29

[56] References Cited

U.S. PATENT DOCUMENTS

| 3,146,057 | 8/1964 | Rona | 73/517 |
| 3,602,037 | 7/1969 | Neu | 73/651 |
| 3,796,095 | 3/1974 | Fussell, Jr. | 73/861.24 |
| 3,831,137 | 8/1974 | Cuomo | 73/653 |
| 3,961,185 | 6/1976 | Brokenshire et al. | 73/517 |
| 4,085,614 | 4/1978 | Curran et al. | 73/861.24 |
| 4,158,310 | 6/1979 | Ho | 73/717 |
| 4,206,642 | 6/1980 | Bearcroft | 73/861.24 |
| 4,281,245 | 7/1981 | Brogardh et al. | 250/227 |
| 4,285,247 | 8/1981 | Klobe | 73/861.24 |
| 4,310,905 | 1/1982 | Palmer | 350/96.15 |
| 4,345,482 | 8/1982 | Adolfsson et al. | 73/653 |
| 4,359,637 | 11/1982 | Perren | 250/227 |
| 4,414,471 | 11/1983 | Rines | 250/227 |

Primary Examiner—Herbert Goldstein
Attorney, Agent, or Firm—T. E. Kristofferson; A. D. Stolzy

[57] ABSTRACT

A vortex flowmeter including a single optical fiber into one end of which a light signal can be transmitted from a source to the other fiber end where it is vortex modulated. Modulated light at the other end is then reflected to a receiver back along the same optical fiber. Relative movement between the other fiber end and a reflector serves to modulate the light signal. Embodiments are disclosed in which the other fiber end moves and the reflector is stationary. In the alternative case, the other fiber end is stationary and the reflector moves.

2 Claims, 6 Drawing Figures

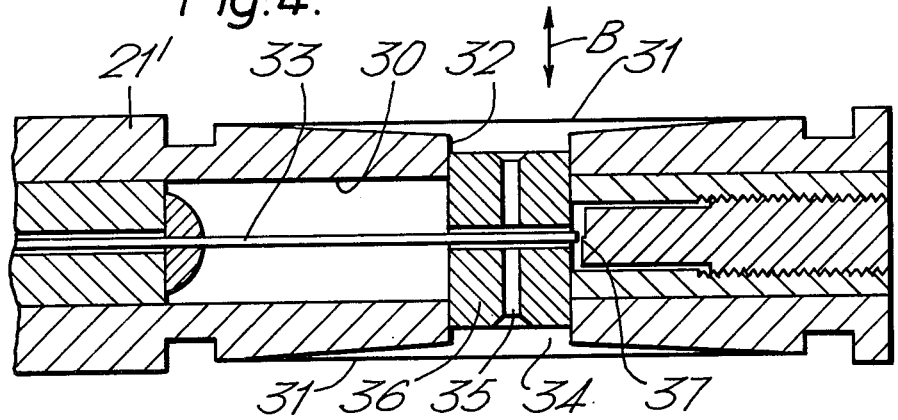
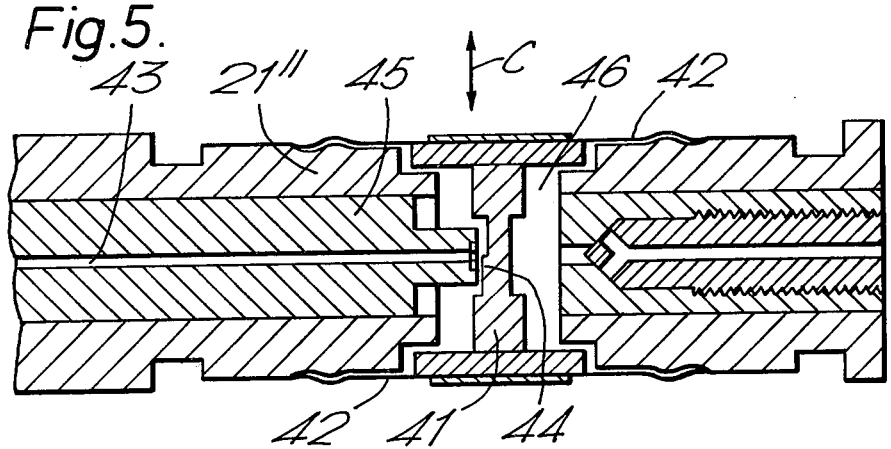
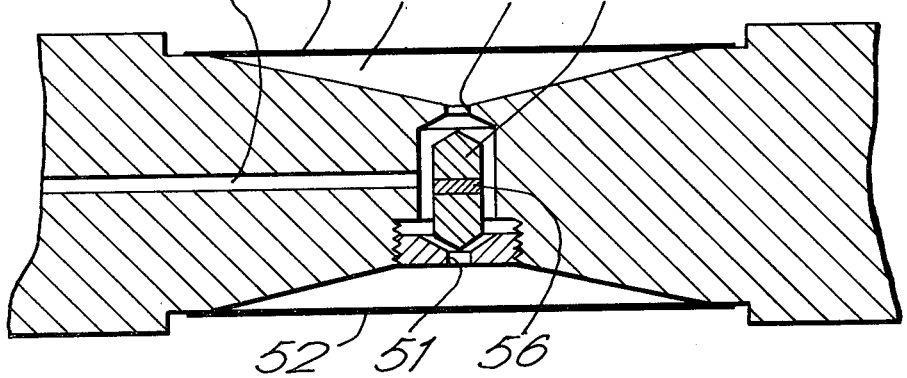

VORTEX FLOWMETER

BACKGROUND OF THE INVENTION

This invention relates to flowmeters, and more particularly to flowmeters of the vortex shedding type.

PRIOR ART STATEMENT

Vortex shedding is a phenomenon which occurs when a fluid flows past a bluff (non-streamlined) body. When a bluff body is placed in a uniform stream of fluid, two separated shear layers are formed, one on each side of the body, the vorticity of the two layers being opposite. A mutual interaction occurs between the two layers and in the absence of disturbing influences, a stable pattern of alternating (i.e. of the opposite rotational sense) vortices is formed downstream of the body. This phenomenon is well known in the art and is commonly called a vortex street.

In a truly uniform flow around certain bluff shapes, this vortex shedding shows a regular periodicity, the frequency being linearly related to the fluid velocity. Various flowmeters employing this principle are old in the art. Typically, they comprise a bluff body disposed in a fluid stream, means for detecting the vortices produced, and associated electronic circuitry which produce an output indicative of the rate of production of vortices, and hence the fluid flow rate.

SUMMARY OF THE PRESENT INVENTION

According to one aspect of the present invention, there is provided a vortex flowmeter including a housing, an optical fiber extending into the housing, light reflection means arranged in the housing adjacent an end of the fiber and adapted to reflect a light signal transmitted to the end of the fiber back into the fiber. The end of the fiber and the light reflection means are movable relative to one another in response to the occurrence of a differential pressure across the housing, or displacement of a member relative to the housing. The reflected light signal is modulated in accordance with the differential pressure or displacement.

According to another aspect of the present invention, there is provided a vortex flowmeter including a vortex detecting sensor arranged within a bluff body adapted to shed vortices into a moving fluid. A light source, a receiver, and frequency measurement circuit are also provided. The sensor includes light modulating means responsive to the vortices. An optical fiber is then provided for coupling a light signal from the light source to the modulating means, the light signal when modulated by the modulating means being transmitted back to the receiver and a frequency measurement circuit along the optical fiber. The modulation frequency of the modulated light signal is then related to the velocity of the moving fluid.

As the same fiber is used for both of the transmitted and received signals, the problem of fiber alignment experienced in previous fiber systems is eliminated.

Copending application Ser. No. 185,629, filed Sept. 10, 1980 by G. D. Pitt and R. J. Williamson 27-4, for APPARATUS FOR MEASURING FLUID FLOW, now U.S. Pat. No. 4,372,165, discloses bidirectional optical fibers. The same is true of R. J. Williamson 3, U.S. Pat. No. 4,241,612 issued Dec. 30, 1980. See also K. E. Bearcroft 6, U.S. Pat. No. 4,206,642 issued June 10, 1980, which discloses a reciprocatory vortex sensor with an optical fiber.

BRIEF DESCRIPTION OF THE DRAWINGS

In the accompanying drawings which illustrate exemplary embodiments of the present invention:

FIG. 4 is a transverse sectional view through a second embodiment of the sensor arrangement of the present invention;

FIG. 5 is a transverse sectional view through a third embodiment of the sensor arrangement of the present invention; and FIG. 6 is a transverse sectional view through a fourth embodiment of the sensor arrangement of the present invention.

DESCRIPTION OF THE PREFERRED EMBODIMENTS

Figure 1:
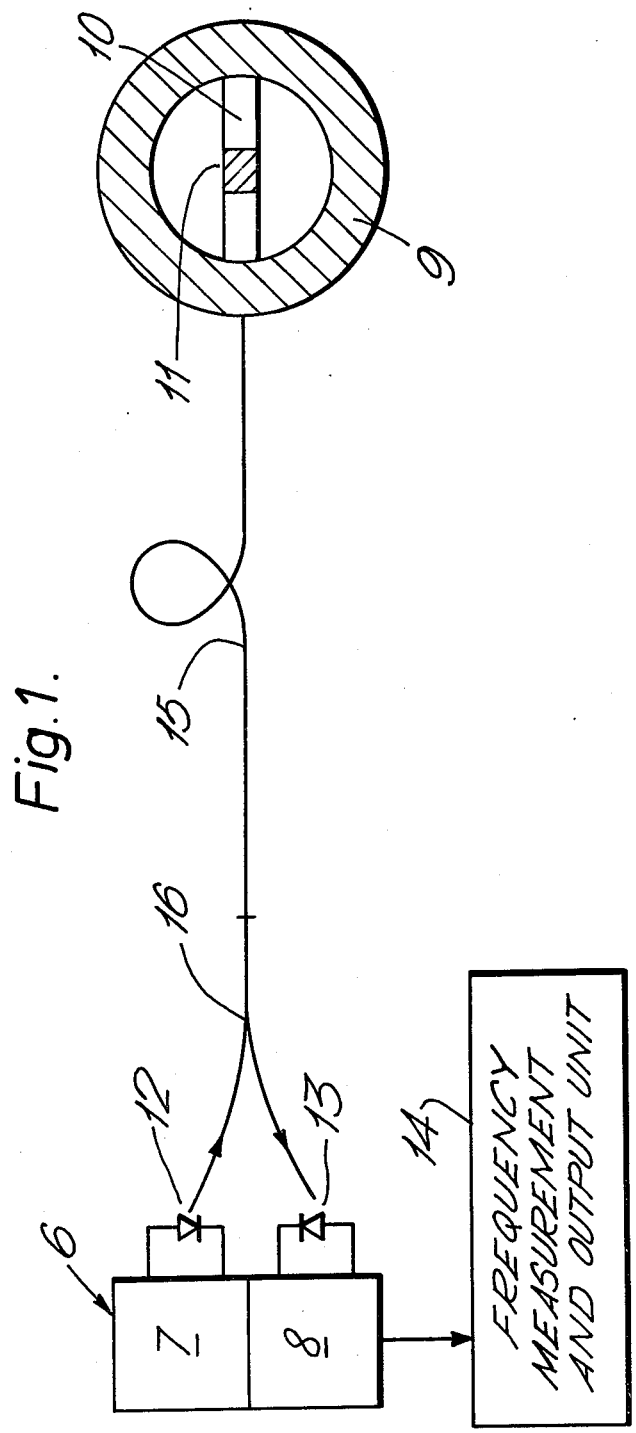
FIG. 1 is a schematic diagram of a flowmeter in which coupling to and from a sensor is effected via a single fiber in accordance with the present invention.

Referring to FIG. 1, a flowmeter is shown including a pipe 9 defining a fluid flow passage. A bluff body 10 is arranged as a bar across the passage. A sensor 11, an optical transmitter 12, e.g., an LED or a solid state laser, an optical receiver 13, e.g., a PIN diode, associated with a frequency measurement and an output unit 14 are also provided. A transceiver 6 is also shown comprising transmit circuitry 7 and receive circuitry 8. The transmitter 12 and receiver 13 are both coupled to the sensor 11 via a single fiber optic cable 15. Typically, this coupling is effected via a Y-coupler 16.

An optical signal, either pulsed or continuous wave (CW), is transmitted from the transmitter 12 to the sensor 11 via the fiber 15, and return signals, at a frequency related to the fluid velocity, are fed back along the fiber 15 to the receiver 13. The receiver output is fed to the frequency measurement and output unit 14 which converts the received modulation frequency to a fluid velocity or volume flow measure.

Components transceiver 6, circuitry 7, circuitry 8, transmitter 12, receiver 13 and unit 14 may all be entirely conventional.

The sensor 11 may be of the type in which a vortex sensitive element is coupled to the fiber 15, movement of the element in response to the generation of a vortex causing a change in the coupling factor and hence a change in the intensity of the optical signal retransmitted along the fiber. For example, the element may be of the movable diaphragm type such as that described in the said K. E. Bearcroft 6 patent. However, a sensor as described hereinafter with reference to FIGS. 3, 4, 5 or 6 of the accompanying drawings is preferred.

Figure 2:
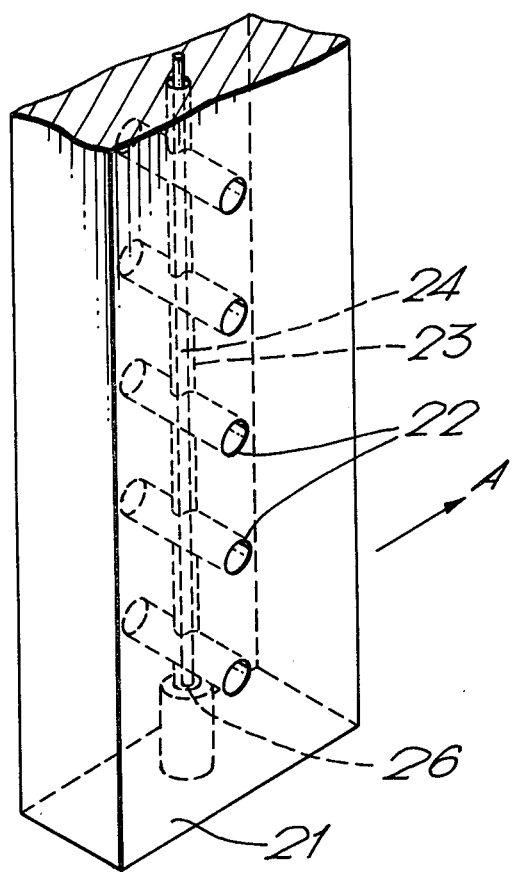
FIG. 2 is a perspective view, partly in section, of a bluff body constructed in accordance with the present invention.

The fiber optic vortex sensor arrangements are incorporated within a bluff body. Such a body provides a vortex generating element when disposed in a fluid stream. In FIG. 2 a rectangular sectioned bluff body 21 is shown, the fluid flow being in the direction of an arrow A. It will, however, be appreciated by those skilled in the art, that a variety of alternative bluff body shapes can be employed. The dimensions of the body will, of course, depend upon the particular flow situation and meter requirement. An alternative bluff body shape is disclosed in U.S. Pat. No. 4,441,372.

Figure 3:
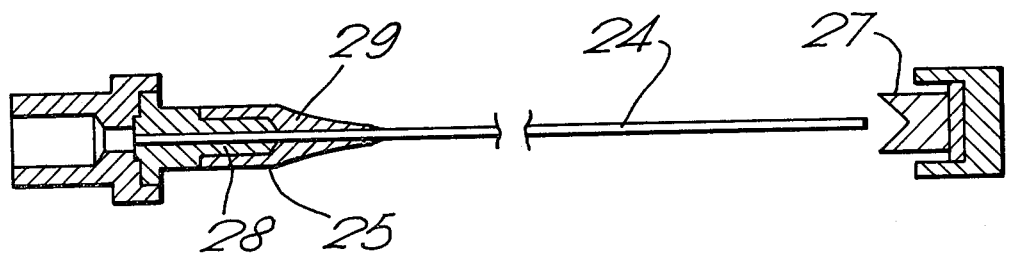
FIG. 3 is a longitudinal sectional view of the sensor arrangement shown in FIG. 2 in accordance with the present invention.

The body 21 has a plurality of transverse bores or cross ports 22 arranged perpendicular to the longitudinal axis of the body and to the fluid flow so as to provide a pathway for fluid oscillations produced by the vortices shedding alternately from the upstream corners of the body. A longitudinal slot 23 communicates with the one or more cross ports 22, and an optical fiber 24, supported in a mount 25 (FIG. 3) at one end of the body, is free to move in the slot 23. The slot 23 is so dimensioned as to allow free movement of the fiber at right angles to the fluid flow in response to the vortices and by virtue of direct contact with the fluid but to restrict movement in the direction of flow. The free end of the fiber is disposed adjacent to a mirror/matt surface interface at 26, or alternatively a corner reflector 27 (FIG. 3). Thus, as the fiber 24 is displaced in the slot 23 by the effect of the vortices, more or less light from the interface is re-transmitted back to the fiber 24. The mount 25 includes a ferrule assembly 28 and a flexible rubber fiber support 29.

Referring to FIG. 4, the sensor embodiment shown therein is a modification of that described with respect to FIGS. 2 and 3 to yield a fully enclosed hermetically sealed sensor disposed within a bluff body 21' having a longitudinal bore 30 and a single transverse bore 32. In this form of sensor, the alternating pressure on the sides of the bluff body is utilized to act upon the sensor which thus constitutes a differential pressure or displacement transducer. The fluctuating differential pressure across the sensor causes diaphragms 31 to deflect. This produces an oscillating flow of an incompressible filling fluid 34 through a cross port 35 in an element 36 arranged in the transverse bore 32. This flow of fluid drags optical fiber 33 from side to side in a flapping motion in the directions indicated by double-headed arrow B thereby modulating the optical signal returned to it from a mirror/matt surface interface at 37. Alternatively, a corner reflector disposed adjacent the free fiber end may be used. The volume of fluid passing through the cross port 35 in one half cycle is equal to that displaced by the respective diaphragm 31. The area of the cross port 35 is much less than that of the diaphragms. Thus, the displacement of the fluid and hence the fiber 33 will be very much larger than the displacement of the diaphragm surface. This arrangement thus provides adequate movement of the fiber with relatively small movements of the diaphragms.

In both of the above sensor arrangements, those skilled in the art will appreciate that various other effects ensuing from the flexure of an optical fiber may also be utilized as a means for producing a modulated optical signal, for example, microbending loss, speckle pattern effects, etc.

Referring to FIG. 5, the third sensor arrangement includes a bluff body 21" having a ferrule 45 arranged in a longitudinal bore thereof, a center pin 41 arranged in a transverse bore of the body 21" and connected between two diaphragms 42. Pin 41 has situated at its center region a mirror/matt surface interface 44 (or corner reflector). Pin 41 is arranged adjacent the free end of a stationary optical fiber 43.

An incompressible fluid 46 fills the transverse bore as in the FIG. 4 embodiment. When a change in pressure due to the shedding of vortices is incident upon one diaphragm 42, the movement of the center pin 41 in the directions of double-headed arrow C is translated into a change in the returned optical signal upon the mirror/matt surface interface 44, thereby causing a modulation of the return optical signal to the optical fiber 43.

Referring to FIG. 6, the fourth sensor arrangement includes a free floating mechanical shuttle 53 instead of the fixed center pin 41 of FIG. 5. This shuttle 53 carries a mirror/matt surface interface 56 and is adjustable in position to oppose a fixed optical fiber 54. The shuttle 53 is free to move within the constraints of the small orifices or cross ports 51. Similar to the sensor of FIG. 4, the large flow of fluid through the orifices 51, under the action of the vortices, by diaphragms 52, drags the shuttle 53 to and fro to cause modulation of the returned optical signal reflected into the optical fiber 54. The mass of the shuttle 53 should be minimized and ideally it should have a specific gravity which approaches the specific gravity of an incompressible filling fluid at 55.

Typically, the sensor materials are stainless steel with stainless steel diaphragms, these being electron beam, resistance or laser welded to form a hermetic seal.

All four of the sensors described above have sufficient sensitivity for use in the measurement of fluid flow rates of both liquids and gases, the only modification required being the recalibration of the frequency measuring circuitry to account for the particular gas or liquid under investigation. Alternatively, the sensors may be used simply to detect differential pressures or displacements.

While the invention has been described with reference to vortex flowmeters, the same arrangement can alternatively be used to determine the relative speed of the sensor and a fluid as in a ship's log.

What is claimed is:

1. A sensor comprising: a housing; an optical fiber extending into said housing; a member mounted in said housing adjacent one optical fiber end; and light reflection means fixed to said member and arranged in said housing adjacent said end of said optical fiber and adapted to reflect a light signal transmitted to one end of said fiber and back into said optical fiber, the end of said optical fiber and said light reflection means being movable relative to one another in response to a force, wherein said light reflection means is fixed relative to said housing and said optical fiber end is movable relative to said light reflection means, wherein said housing has a passageway having an intersecting bore, said passageway extending between opposite housing faces, said optical fiber extending into said bore, said optical fiber being moved in said bore and relative to said light reflection means, wherein a respective diaphragm member is sealed to each of said opposite housing faces whereby to define in part a sealed chamber in said housing, an incompressible fluid filling said sealed chamber, the occurrence of a change in differential pressure between said housing faces causing a deflection of said diaphragms and a corresponding movement of said optical fiber, and wherein said member is arranged in said passageway, movement of said optical fiber being restricted by said member, said member having a first bore, said optical fiber extending through said first bore, said member having a second bore extending between said opposite housing faces, movement of one of said diaphragms causing movement of said incompressible filling fluid through said second bore.

2. A sensor comprising: a housing; an optical fiber extending into said housing; a member mounted in said housing adjacent one optical fiber end; and light reflection means fixed to said member and arranged in said housing adjacent said end of said optical fiber and adapted to reflect a light signal transmitted to one end of said fiber and back into said optical fiber, the end of said optical fiber and said light reflection means being movable relative to one another in response to a force, wherein said light reflection means is fixed relative to said housing and said optical fiber end is movable relative to said light reflection means, wherein means are provided to detect displacement of said member relative to said housing, said housing having a passageway and opposite faces on opposite portions thereof, at least one face of said housing being adjacent said member, a bore extending transversely to said passageway, said optical fiber being arranged in said bore, said bore and said passageway intersecting, a respective diaphragm member being sealed to each of said opposite housing faces whereby to define in part a sealed chamber in said housing, an incompressible fluid filling said sealed chamber, movement of one of said diaphragms causing a corresponding movement of said optical fiber, and wherein said member is arranged in said passageway, movement of said optical fiber being restricted by said member, said member having a first bore, said optical fiber extending through said first bore, said member having a second bore extending between said opposite housing faces, movement of one of said diaphragms causing movement of said incompressible filling fluid through said second bore.

* * * * *